US011462879B2

(12) United States Patent
Murphy et al.

(10) Patent No.: US 11,462,879 B2
(45) Date of Patent: Oct. 4, 2022

(54) LASER SPOT CONTRAST ENHANCEMENT

(71) Applicant: BAE Systems Information and Electronic Systems Integration Inc., Nashua, NH (US)

(72) Inventors: Robert H. Murphy, Lancaster, MA (US); Michael D. Joswick, Bedford, NH (US); Susan Palmateer, Harvard, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 359 days.

(21) Appl. No.: 16/628,464

(22) PCT Filed: Jul. 5, 2017

(86) PCT No.: PCT/US2017/040649
§ 371 (c)(1),
(2) Date: Jan. 3, 2020

(87) PCT Pub. No.: WO2019/040036
PCT Pub. Date: Feb. 28, 2019

(65) Prior Publication Data
US 2020/0127437 A1    Apr. 23, 2020

(51) Int. Cl.
*H01S 3/10* (2006.01)
*G01J 1/42* (2006.01)
(Continued)

(52) U.S. Cl.
CPC ........ *H01S 3/10015* (2013.01); *G01J 1/4257* (2013.01); *G02B 27/20* (2013.01); *H04N 5/04* (2013.01); *G01J 2001/4238* (2013.01)

(58) Field of Classification Search
CPC ................ H01S 3/10015; G01J 1/4257; G01J 2001/4238; H04N 5/04; H04N 5/12
See application file for complete search history.

(56) References Cited

U.S. PATENT DOCUMENTS

2008/0122933 A1* 5/2008 Murayama ............. H04N 5/332
257/E27.162
2010/0302282 A1  12/2010 Dobbie et al.
(Continued)

FOREIGN PATENT DOCUMENTS

WO      2016111999 A1    7/2016

OTHER PUBLICATIONS

International Search Report, PCT/US17/40649, dated Oct. 25, 2017, 9 pages.

*Primary Examiner* — Kevin K Pyo
(74) *Attorney, Agent, or Firm* — Gary McFaline; Sand, Sebolt & Wernow LPA

(57) ABSTRACT

A system and method for enhancing laser contrast on a remote target utilizing an image processor and a laser power controller is provided. An image processor in an imaging device manipulates a laser power controller in a laser system so that a laser beam emitted from a laser system is ultimately synchronized with the imaging device. Firstly, the original laser signal is shifted one time frame relative to the plurality of time frames to create a shifted laser signal. Secondly, the shifted laser signal is subtracted from the original laser signal. Thirdly, the subtracted laser signal is magnified by a frequency band pass filter. The filtered laser signal is added to the original signal to become the finalized laser signal which has better contrast than the original signal.

18 Claims, 5 Drawing Sheets

(51) Int. Cl.
G02B 27/20 (2006.01)
H04N 5/04 (2006.01)

(56) References Cited

U.S. PATENT DOCUMENTS

2011/0292406 A1 12/2011 Hollenbeck et al.
2015/0263806 A1 9/2015 Puscasu et al.

* cited by examiner

LASER SPOT CONTRAST ENHANCEMENT

STATEMENT OF GOVERNMENT INTEREST

The present disclosure was made with government support under Contract No. N00164-11-C-JQ60 awarded by the United States Department of the Army. The government has certain rights in the invention.

BACKGROUND

Technical Field

The present disclosure relates generally to a system and a method for enhancing contrast of a laser spot. Particularly, the present disclosure relates to the system and the method which enable the laser spot to be detected more readily at an increased distance or range formed on a target. More particularly, the present disclosure relates to the system and the method which takes advantage of a pulsing laser spot with a divergence angle (DA) and a pulse rate (LR) which is at most half of a frame rate (FR) of an imaging device.

Background Information

The range or distance between an imaging device or imager and an object or target within the field-of-view (FOV) of the imaging device being illustrated or radiated with a pulsing visible or invisible laser is frequently insufficient due to low laser spot contrast. Mostly, low laser spot contrast results from a low powered laser. Moreover, it is difficult to keep tracking or targeting an enemy object flying in the air with a low powered laser because the laser spot on the target cannot easily be detected if it has low contrast. One of the existing solutions is to increase the size of the laser which eventually increases the power of the laser. However, it is sometimes difficult because increasing the size of the laser is not always achievable due to structural limitation. Furthermore, to increase the size of the laser will eventually lead to increase the weight of the laser and often require and consume more energy as well.

SUMMARY

Therefore, there is need for a new system or a method to increase the contrast of the laser beam without changing its physical size or power of laser which will increase the weight of a laser system.

One exemplary embodiment of the present disclosure may relate to a method for enhancing laser contrast on a remote target utilizing an image processor and a laser power, controller. The image processor in an imaging device manipulates the laser power controller in a laser system so that the laser beam emitted from a laser system is ultimately synchronized with the imaging device. The original laser signal is shifted one time frame relative to the plurality of time frames to create a shifted laser signal. Then, the shifted laser signal is subtracted from the original laser signal. Then, the subtracted laser signal is magnified by a frequency band pass filter. The filtered laser signal is added to the original signal to become the finalized laser signal which has higher contrast than the original signal.

In one aspect, one embodiment of the present disclosure may provide a system for enhancing laser contrast on a remote target comprising an imaging device which includes an image processor, a laser system which includes a laser power controller and a laser emitter, and wherein the image processor in the imaging device is electrically in communication with the laser power controller configured to synchronize the image processor with the laser power controller and wherein the laser power controller is operatively engaged with the laser emitter.

In another aspect, one embodiment of the present disclosure may provide a method for enhancing laser contrast on a remote target comprising: providing an imaging device and an image processor; providing a laser power controller and a laser emitter; synchronizing the image processor and the laser power controller with a synchronizer; generating a first laser signal relative to a plurality of time frames; shifting a magnitude of the first laser signal one time frame relative to the plurality of time frames to form a second laser signal; subtracting the second laser signal from the first laser signal to form a third laser signal; magnifying the third signal using a frequency bandpass filter to form a fourth laser signal; adding the fourth laser signal to the first signal to form an amplified fifth laser signal; synchronizing the fifth laser signal with the imaging device by the synchronizer to form a synchronized signal; and emitting the synchronized signal to a target.

BRIEF DESCRIPTION OF THE SEVERAL VIEWS OF THE DRAWINGS

A sample embodiment of the present disclosure is set forth in the following description, is shown in the drawings and is particularly and distinctly pointed out and set forth in the appended claims.

Similar numbers refer to similar parts through the drawings.

DETAILED DESCRIPTION

The present disclosure relates to a system and method for enhancing contrast of a laser spot so that the laser spot can be detected readily at an increased distance or range.

Figure 1:
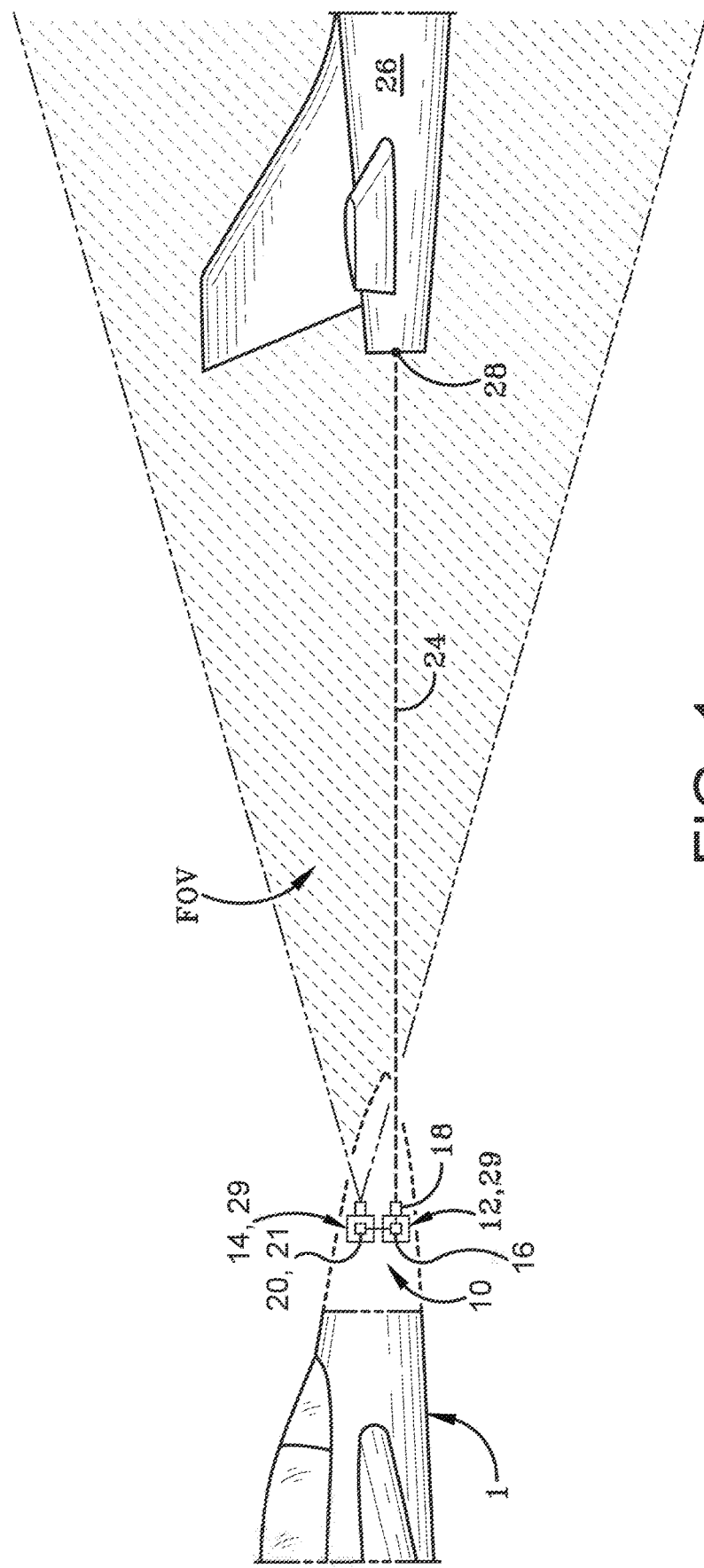
FIG. 1 (FIG. 1) illustrates one embodiment of a laser contrast enhancing system mounted on an airplane to enhance the contrast of the laser spot formed on a remote target.

FIG. 1 illustrates an exemplary view of a laser spot enhancing system 10 mounted on an airborne vehicle such as airplane 1. The system 10 comprises a laser system 12 and an imaging device 14. The laser system 12 comprises a laser power controller 16 and a laser emitter 18. The image device 14 can be any camera system or any imager. The imaging device 14 includes an image processor 20. In one particular embodiment, the imaging device 14 houses the image processor 20 inside of the imaging device 14. However, in another embodiment, the imaging device 14 and the image processor 20 can be separated from each other. In one particular embodiment, the imaging device 14 and the laser system 12 are located side by side as shown in FIG. 1. In another embodiment, the imaging device 14 and the laser system 12 may be attached to form a single device. In each scenario, the image processor 20 is in operative communication with the laser power controller 16 in the laser system 12 so that the image processor 20 knows timing of an emitted laser signal by the laser emitter 18 because the laser power controller 16 is engaged with the laser emitter 18 and is electrically in communication with the laser emitter 18. Particularly, the imaging device 14 and the laser system 12 are synchronized so that the image processor 20 knows when a laser beam is on and when the laser beam is off. Furthermore, the laser beam is within the field of view (FOV) of the imaging device 14 so that the imaging device 14 is looking in the same vicinity with the laser beam emitted from the laser emitter 18.

Initially, an enhanced laser beam 24, which is processed by the method described herein in below, exits the laser emitter 18 to form an enhanced laser spot 28 on a remote enemy or target 26. Simultaneously, the imaging device 14 detects the laser spot 28 on the target 26. Since the laser spot 28 on the target 26 is brighter than a normal laser spot, the imaging device 14 can more easily detect the laser spot 28 on the target 26.

In this particular embodiment, the laser image processing method takes advantage of a pulsing laser spot with a known divergence angle (DA) and a pulse rate (PR) of at most half of the frame rate (FR) of the imaging device 14. However, in another embodiment, the pulse rate (PR) can be a certain integer divider of the frame rate (FR) of the imaging device 14. In each scenario, the pulse rate (PR) from the laser beam 24 and the frame rate (FR) of the imaging device 14 must be synchronized. For example, if the imaging device 14 is operating at 60 frames per second, the laser beam 24 would be turning on and off (i.e., pulsing) at 30 frames per second or 30 times per second. Among these frames, the odd frames such as the first, third, fifth, and seventh frames etc. may have the laser beam on. On the contrary, the even frames such as the second, fourth, sixth, and eighth frames etc. may have the laser beam off. Furthermore, due to the temporal responses of the human eye, optimal performance is obtained for a human observer when the pulse rate (PR) is in the range of approximately from 5 Hz to 15 Hz. For example, if the pulse rate (PR) is set to 5 Hz, then the frame rate (FR) of the imaging device 14 is set to 10 Hz. However, the frame rate (FR) of the imaging device 14 still can be at most 10 Hz. If the pulse rate (PR) is set to 15 Hz, then the frame rate (FR) of the imaging device 14 is set to 30 Hz. However, similarly, the frame rate (FR) of the imaging device 14 can be set to at most 30 Hz. In another embodiment, the pulse rate (PR) can be at most 5 Hz or greater than 15 Hz.

After the laser beam 24 is processed by the method provided herein to have higher laser spot contrast, the laser emitter 18 is ready to emit an enhanced laser signal to the target 26. By doing so, a pulse rate of the enhanced laser signal is synchronized with a frame rate of the imaging device 14 to form an emitted signal by a synchronizer 29 which synchronizes the image controller and the laser power controller. In one embodiment, the synchronizer 29 is mounted either on the imaging device 14 or the laser system 12. In another embodiment, the synchronizer 29 may be remotely mounted from the laser system 12 and the imaging device 14.

Contrast of the laser spot 28 on the remote target 26 may depend on various factors such as laser power or distance between a laser detection device and the target. Thus, one way to increase contrast of the laser spot 28 without changing physical configuration of a laser system is to boost contrast of the laser beam just before the laser beam is emitted to the target in the air. By doing so, the laser beam must be processed to have more vivid contrast by the image processor mounted on an airplane so that contrast of the laser spot 28 of the laser beam at the remote target 26 is sufficiently increased to be readily detected by the laser detection device in the laser system mounted on the airplane 1. The detailed method of the contrast enhancement by the particular laser signal processing is provided herein.

First, the image processor 20 of the imaging device 14 controls the laser output power. Particularly, the laser output power turns the laser optical power on and off (i.e., pulses) by programmable logic in the image processor 20. The laser is turned on for approximately one frame time of the imaging device 14 and then turned off for one frame time of the imaging device 14. Furthermore, the image processor 20 uses image processing algorithm, instructions encoded on a non-transitory computer readable storage medium, and logic which control the laser output power so that the laser beam 24 and the imaging device 14 can be synchronized. Thus, the imaging device 14 knows when the laser beam 24 is on and when the laser beam 24 is off.

Figure 2:
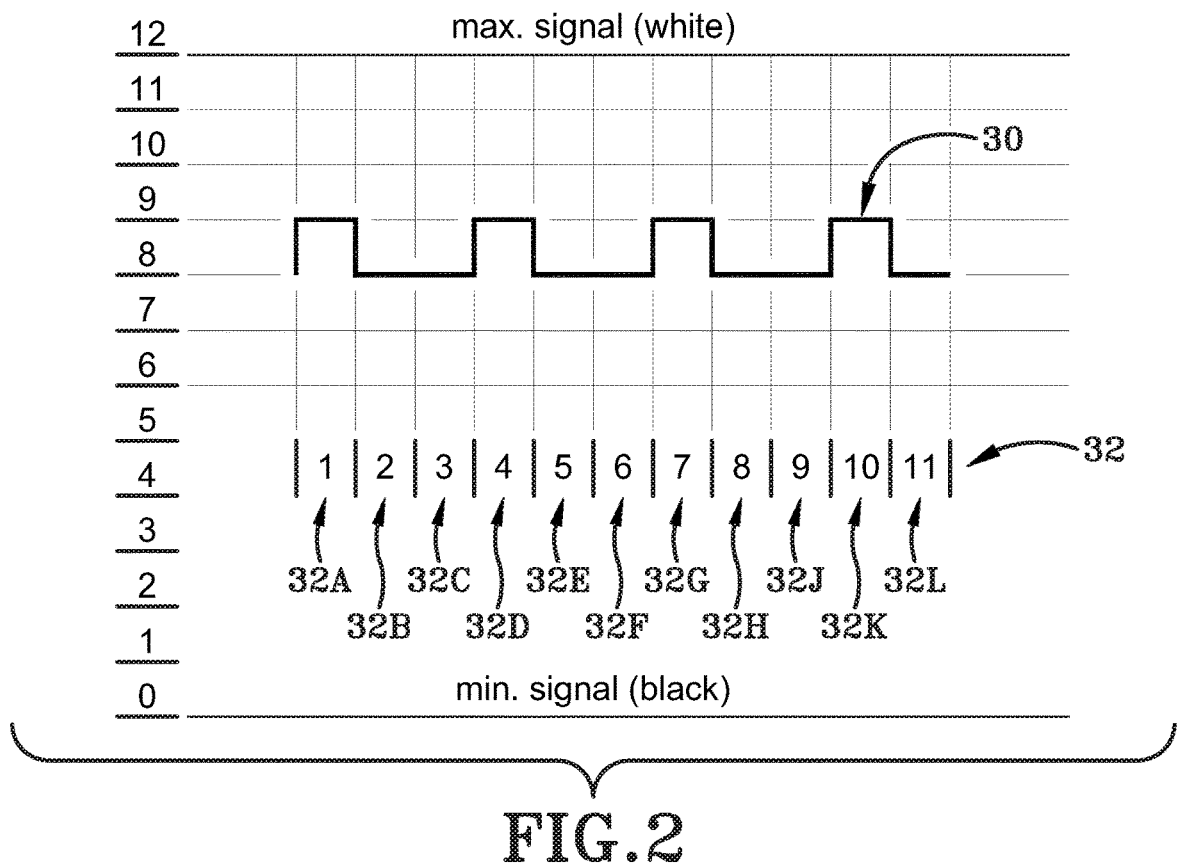
FIG. 2 (FIG. 2) illustrates one example of a first laser signal relative to a plurality of time frames.

FIGS. 2 to 6 show a method of enhancing contrast of the laser beam 24 without physically modifying the laser system 12 such as increasing laser power supply or size of the laser beam 24. As depicted in FIG. 2, the laser system 12 produces a first pulsed signal 30 which is pulsed between arbitrary magnitudes of "8" and "9". In particular, when the laser beam 24 is off, then the first signal 30 has a magnitude of "8". On the contrary, when the laser beam 24 is on, then the first signal 30 has a magnitude of "9". An X-axis on each graph shown in FIGS. 2 to 6 represents a sequence of time frames. A Y-axis on each graph shown in FIGS. 2-6 represents a magnitude of contrast of the laser beam 24. For example, a magnitude of "0" indicates the minimum signal magnitude is a black color, whereas a magnitude of "12" indicates the maximum signal magnitude is a white color. A magnitude between "1" and "11" inclusive is a gray color. Furthermore, the signal has a total of eleven time frames 32. Each time frame represents a discrete time interval such that each frame may indicate a second or a millisecond etc.

As shown in FIG. 2, at a first frame 32A, the laser beam 24 is turned on, and the signal 30 has a magnitude of "9" until the next frame comes. At a second and a third frame 32B, 32C, the laser beam 24 is turned off such that the first signal 30 has a magnitude of "8". At a fourth frame 32D, the laser beam 24 is turned on again such that a magnitude of the signal 30 jumps back to "9". At a fifth and sixth frame 32E, 32F, the laser beam 24 is turned off such that magnitude of the first signal 30 returns to "8". At a seventh frame 32G, the laser beam 24 is turned on to make the first signal 30 jumps up to a magnitude of "9". At an eighth and ninth frame 32H, 32J, the laser beam 24 is turned off such that a magnitude of the first signal 30 returns to a magnitude of "8". At a tenth frame 32K, the laser beam 24 is turned on so that the first signal 30 jumps up to a magnitude of "9". At an eleventh frame 32L, the laser beam 24 is turned off, and the first signal 30 returns to a magnitude of "8".

Figure 3:
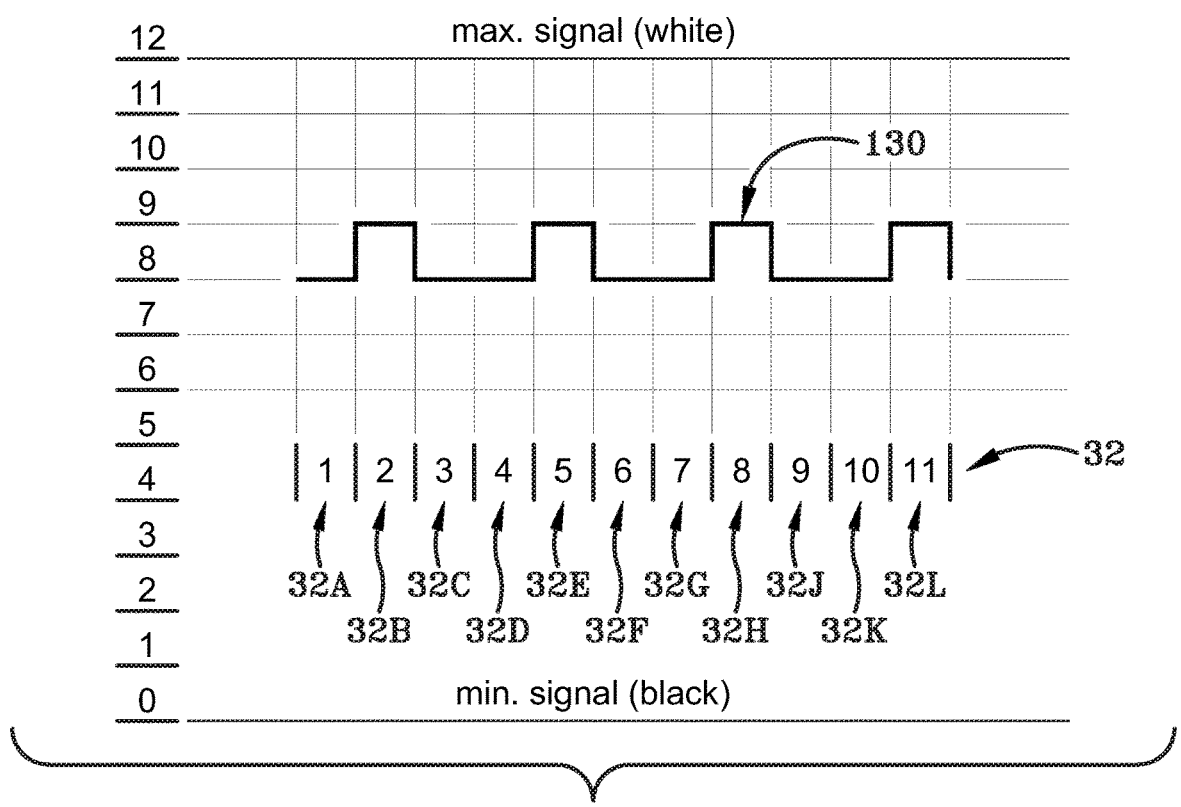
FIG. 3 (FIG. 3) illustrates one example of a second laser signal which is formed by shifting the first signal one time frame relative to the plurality of time frames.

As depicted in FIG. 3, the first signal 30 of the FIG. 2 is shifted one time frame relative to the plurality of frames 32 to generate a shifted second signal 130 by the image processor 20. Specifically, the first signal 30 is shifted to a right side relative to the original frames 32 such that, for example, the signal magnitude of the first frame 32A is now located on the second frame 32B. The signal magnitude of the second frame 32B in the signal 30 is now located on the third frame 32C and so on. This shifting process proceeds until the signal magnitude of the last frame 32L in the signal 30 is located on the first frame 32A. As shown, the first signal 30 and the second signal 130 are exactly the same except magnitudes are shifted to the right side as relative to the frames 32 as described herein. However, in another embodiment, the first signal 30 can be shifted to a left side relative to the frames 32.

Figure 4:
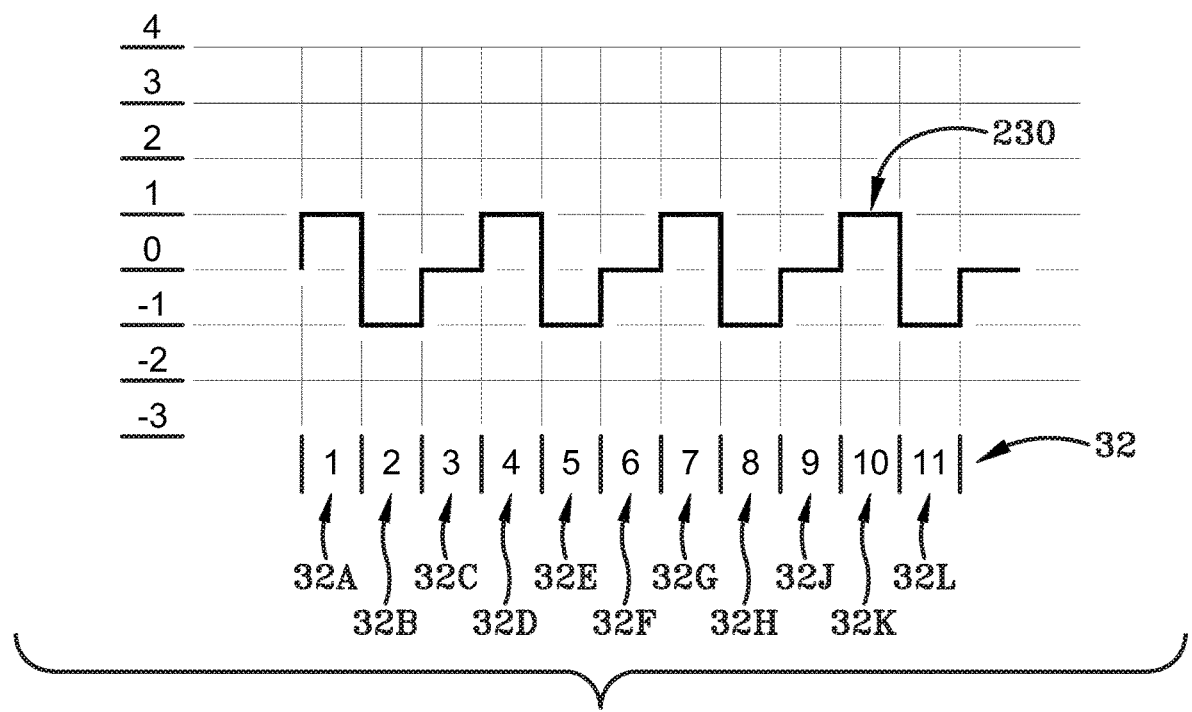
FIG. 4 (FIG. 4) illustrates one example of a third laser signal which is formed by subtracting the second signal from the first signal.

As depicted in FIG. 4, a third signal 230 is shown. The third signal 230 is generated by the image processor 20 by taking the difference between the second signal 130 and the first signal 30, more particularly, subtracting the second signal 130 from the first signal 30. As depicted in FIG. 4, at the first frame 32A, the third signal 230 now indicates "1" because the second signal 130 at the first frame 32A is "8" and the first signal 30 at the first frame 32A is "9" (i.e., 9−8=1). At the second frame 32B, the third signal 230 indicates "−1" because the second signal 130 at the second frame 32B is "9", and the first signal 30 at the second frame 32B is "8" (i.e., 8−9=−1). At the third frame 32C, the third signal 230 indicates "0" because the second signal 130 at the third frame 32C is "8", and the first signal 30 at the third frame 32B is "8" (i.e., 8−8=0). At the fourth frame 32D, the third signal 230 indicates "1" because the second signal 130 at the fourth frame 32D is "8", and the first signal 30 at the fourth frame 32B is "9" (i.e., 9−8=1). At the fifth frame 32E, the third signal 230 indicates "−1" because the second signal 130 at the fifth frame 32E is "9", and the first signal 30 at the fifth frame 32E is "8" (i.e., 8−9=−1). At the sixth frame 32F, the third signal 230 indicates "0" because the second signal 130 at the sixth frame 32F is "8", and the first signal 30 at the sixth frame 32F is "8" (i.e., 8−8=0). At the seventh frame 32G, the third signal 230 indicates "1" because the second signal 130 at the seventh frame 32G is "8", and the first signal 30 at the seventh frame 32G is "9" (i.e., 9−8=1). At the eighth frame 32H, the third signal 230 indicates "−1" because the second signal 130 at the eighth frame 32H is "9", and the first signal 30 at the eighth frame 32H is "8" (i.e., 8−9=−1). At the ninth frame 32J, the third signal 230 indicates "0" because the second signal 130 at the ninth frame 32J is "8", and the first signal 30 at the ninth frame 32J is "8" (i.e., 8−8=0). At the tenth frame 32K, the third signal 230 indicates "1" because the second signal 130 at the tenth frame 32K is "8", and the first signal 30 at the tenth frame 32K is "9" (i.e., 9−8=1). At the eleventh frame 32L, the third signal 230 indicates "−1" because the second signal 130 at the eleventh frame 32L is "9", and the first signal 30 at the eleventh frame 32L is "8" (i.e., 8−9=−1).

By subtracting the second signal 130 from the first signal 30, the contrast of the laser spot can be identified by the image processor easily because the amplitude is pulsing back and forth between −1 and 1 so that laser spot is now flashing. Because the laser spot 28 is flashing on the target 26, a laser detection device in the laser system 12 can readily identify the spot on the target 26. Furthermore, since the laser spot 28 on the target 26 is pulsing on and off at about half the imager frame rate, the third signal 230 may have a majority of the scene content removed due to frame subtraction and may have the peak-to-peak amplitude of the pulsing laser spot doubled also due to subtraction.

Figure 5:
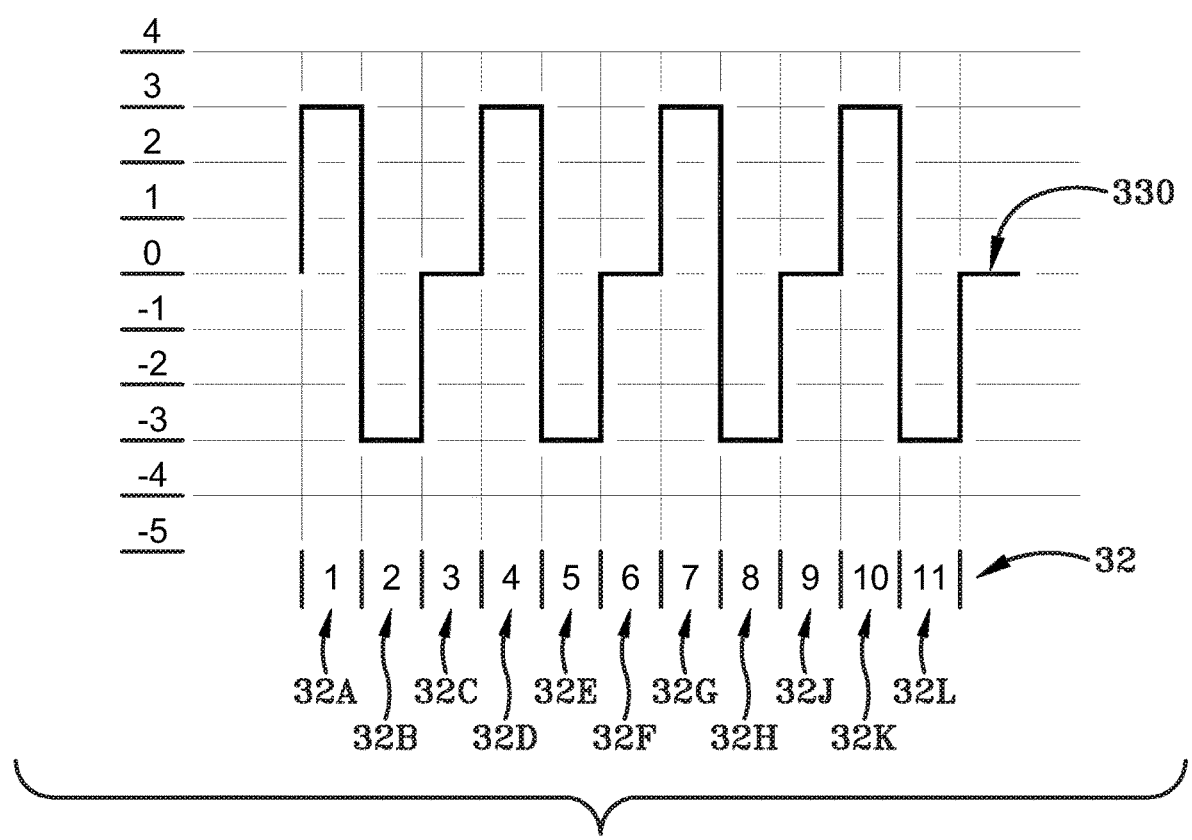
FIG. 5 (FIG. 5) illustrates one example of a fourth laser signal which is formed by amplified by a bandpass filter and scaler.

Referring to FIG. 5, the third signal 230 is processed by a bandpass filter to become a fourth signal 330. After the laser spot 28 is isolated from the scene by subtracting the second signal 130 from the first signal 30, the peak-to-peak amplitude of the signal is amplified by applying a frequency bandpass filter to the third signal 230 with a cut-on frequency approximately from 1.4 to 2 times greater than the spot divergence angle and a cut-off frequency approximately from 0.5 to 0.7 times greater than the spot divergence angle, which is later multiplied by a scaler in the range of 2-10. The application of the frequency bandpass filter provides an additional benefit of suppressing residual scene content from the frame differencing in the step of subtracting between the second signal 130 from the first signal 30 above by falling outside the narrow range of spatial frequencies defined by the essentially Gaussian shape of the laser spot. Compared to the third signal 230 in FIG. 4, the amplitude of the signal 330 either increases or decreases at least by three times so that for example, signals at the first frame 32A, the fourth frame 32D, the seventh frame 32G, and the tenth frame 32K increases from amplitude 1 to amplitude 3. On the contrary, signals at the second frame 32B, the fifth frame 32E, the eighth frame 32H, and the eleventh frame 32L decreases from amplitude −1 to amplitude −3.

Figure 6:
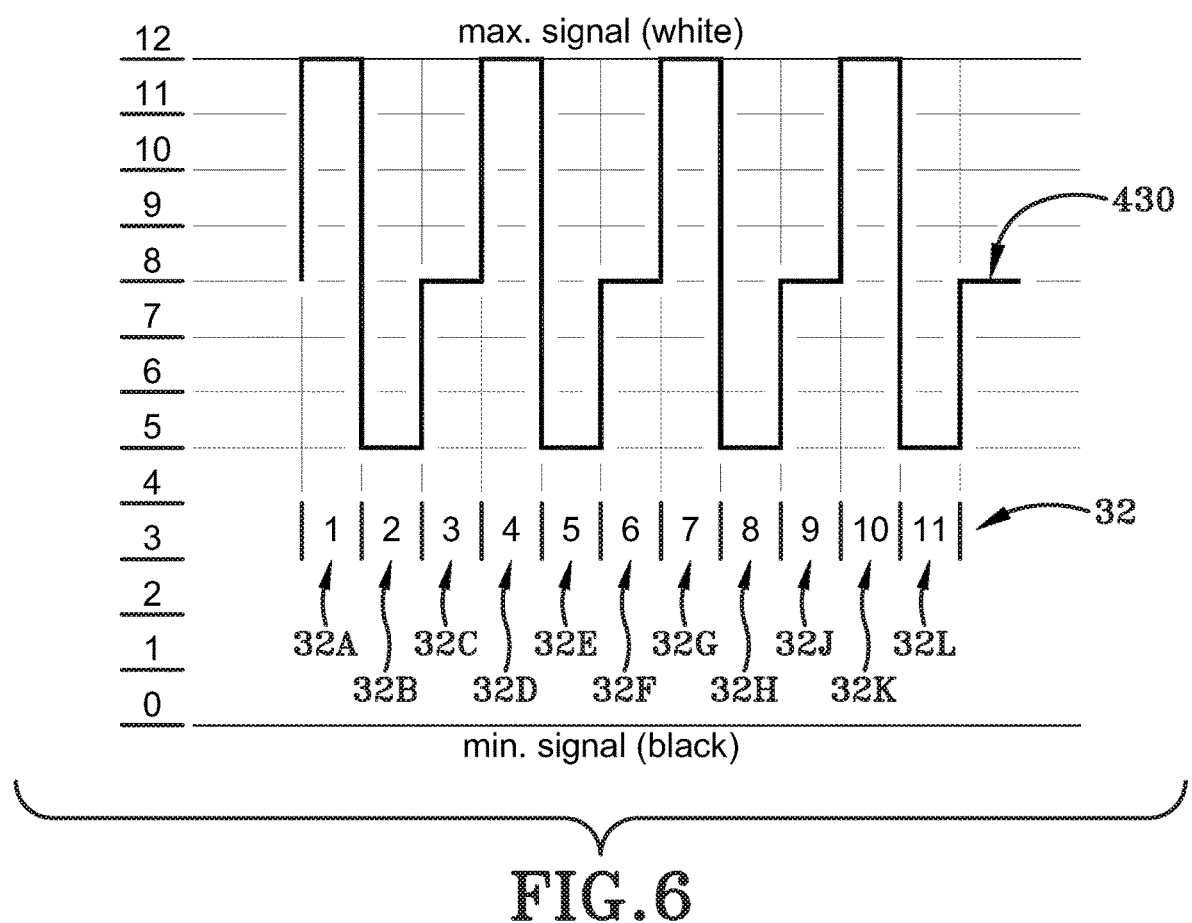
FIG. 6 (FIG. 6) illustrates one example of a fifth laser signal which is formed by adding the first signal to the fourth signal.

As depicted in FIG. 6, a fifth signal 430 is shown. The fifth signal 430 is produced by adding the first signal 30 to the fourth signal 330. This process yields the original frame sequence with zero latency and significantly enhanced pulsing laser spot. The fifth signal 330 is named as Enhanced Laser Spot (ELS) and is the finalized laser beam 24 before being emitted by the laser emitter 18 to the target 26. As shown, at the first frame 32A, the fifth signal 330 has a magnitude of "12" by adding the first signal 30 and the fourth signal 230 which have magnitudes of "3" and "9" respectively. At the second 32B, the fifth signal 300 has a magnitude of "5" because of the addition of the first signal 30 to the fourth signal 230 which have magnitudes of "−3" and "8" respectively. As the third frame 32C, the fifth signal 330 has a magnitude of "8" by adding the first signal 30 to the fourth signal 230 which have magnitudes of "8" and "0" respectively. At the fourth frame 32D, the fifth signal 330 has a magnitude of "12" by adding the first signal 30 and the fourth signal 230 which have magnitudes of "3" and "9" respectively. At the fifth frame 32E, the fifth signal 330 has a magnitude of "5" by adding the first signal 30 and the fourth signal 230 which have magnitudes of "−3" and "8" respectively. At the sixth signal 32F, the sixth signal 330 has a magnitude of "8" by adding the first signal 30 and the fourth signal 230 which have magnitudes of "8" and "0" respectively. At the seventh frame 32G, the fifth signal 330 has a magnitude of "12" by adding the first signal 30 and the fourth signal 230 which have magnitudes of "3" and "9" respectively. At the eighth frame 32H, the fifth signal 330 has a magnitude of "5" by adding the first signal 30 and the fourth signal 230 which have magnitudes of "−3" and "8" respectively. At the ninth signal 32J, the sixth signal 330 has a magnitude of "8" by adding the first signal 30 and the fourth signal 230 which have magnitudes of "8" and "0" respectively. At the tenth fourth frame 32K, the fifth signal 330 has a magnitude of "12" by adding the first signal 30 and the fourth signal 230 which have magnitudes of "3" and "9" respectively. At the eleventh frame 32L, the fifth signal 330 has a magnitude of "5" by adding the first signal 30 and the fourth signal 230 which have magnitudes of "−3" and "8" respectively. At the twelfth signal 32M, the sixth signal 330 has a magnitude of "8" by adding the first signal 30 and the fourth signal 230 which have magnitudes of "8" and "0" respectively.

As compared to FIG. 1, which is the original laser signal 30, the magnitude of the finalized laser signal 330 has been boosted drastically. Firstly, the magnitudes of the finalized signal 330 at the first frame 32A, the fourth frame 32D, the seventh frame 32G, and the tenth frame 32K have been boosted from "9" to "12". Secondly, the magnitudes of the finalized signal 330 at the second frame 32B, the fifth frame 32E, eighth frame 32H, and the eleventh frame 32L have been reduced from "8" to "5". Thirdly, however, the magnitudes at the third frame 32C, the sixth frame 32F, the ninth frame 32J remain the same at "8" for both the original signal 30 and the finalized signal 330. As shown in FIG. 6, the difference in the magnitude of the finalized signal 330 from the maximum magnitude to the minimum magnitude is about "7". On the contrary, the difference in the magnitude of the first signal 30 from the maximum signal to the minimum signal is about "1". Thus, contrast of the laser spot 28, which is indicated by the difference between the maximum magnitude and the minimum magnitude increases from "1" to "7" through the proposed contrast enhancing method herein.

Figure 7:
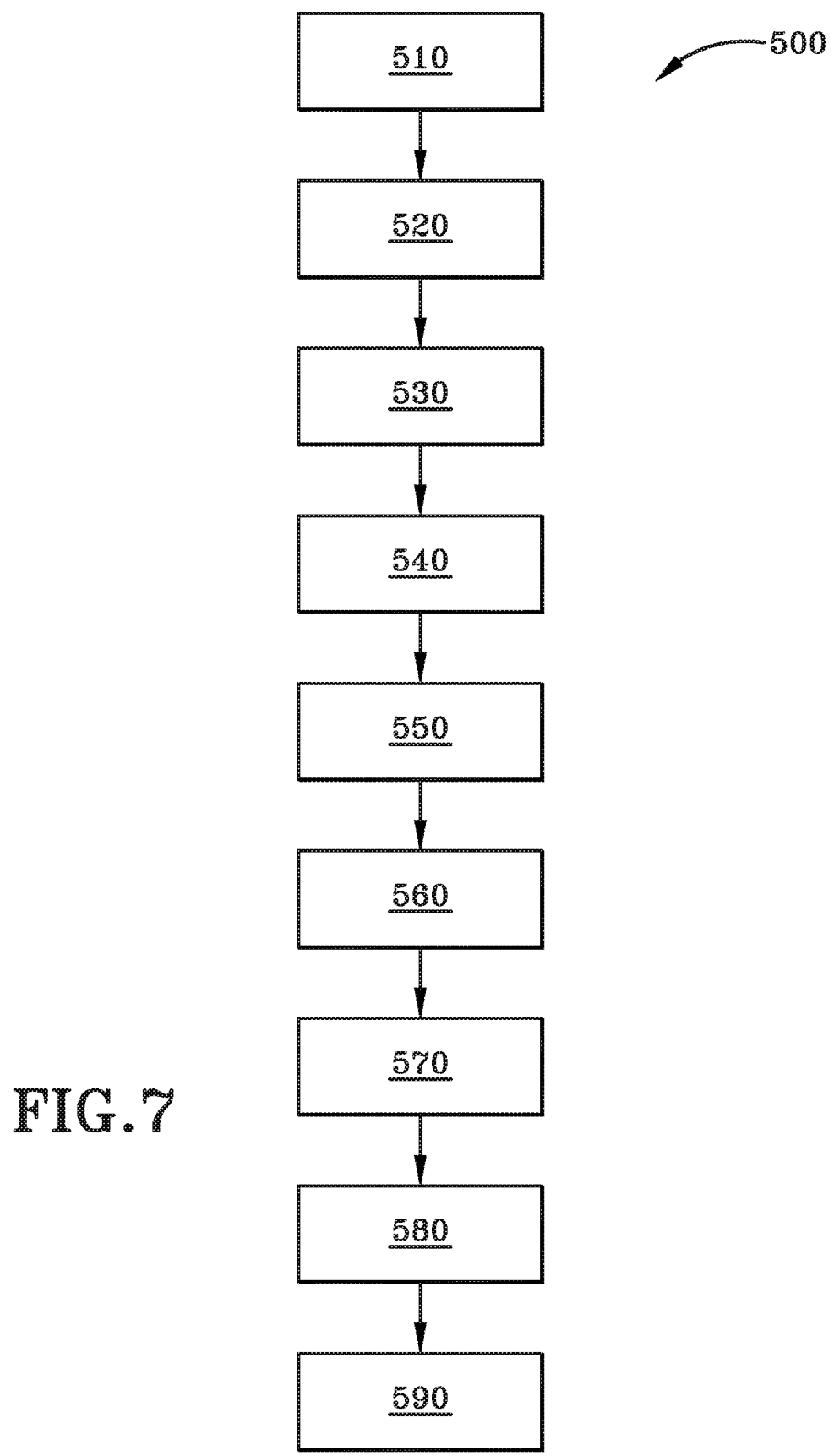
FIG. 7 (FIG. 7) is an exemplary flow chart for a method of enhancing a laser spot on the remote target associated with the current disclosure.

FIG. 7 depicts an exemplary flow chart of a method 500 for enhancing laser beam contrast on the remote target 26. The method 500 may include providing an imaging device 14 and an image processor 20, which Is shown at 510. The method 500 may also include a laser power controller and a laser emitter 18, which is shown at 520. The method 500 may also include synchronizing the image processor 20 and the laser power controller 16 with a synchronizer 29, which is shown generally at 530. The method 500 may also include generating a first laser signal relative to a plurality of time frames, which is shown generally at 540. The method 500 may also include shifting the first signal one time frame relative to the plurality of time frames to create a scorned laser signal, which is shown generally at 550. The method 500 may also include subtracting the second laser signal from the first laser signal to create a third laser signal, which is shown generally at 560. The method 500 may also include magnifying the third signal using a frequency bandpass filter to create a forth laser signal, which is shown generally at 570. The method 500 may also include adding the fourth laser signal to the first signal to create an amplified fifth laser signal, which is shown generally at 580. The method 500 may also include synchronizing the fifth laser signal with the imaging device by the synchronizer to form a synchronized signal, which is shown at 580. The method 500 may also include emitting the synchronized signal to the target 26, which is shown at 590.

The method 500 of enhancing laser beam contrast on the remote target 26 may also include emitting a pulsing laser beam which has a laser spot with a divergence angle and a pulse rate of is at most half of a frame rate of the imaging device 14. In this scenario, if the imaging device 14 is going at 60 frames per second, the laser beam 24 would be turning on and off at 30 frames per second or 30 times per second.

The method 500 of enhancing laser beam contrast on the remote target 26 may also include applying the frequency bandpass filter to the third signal with a cut-on frequency approximately from about 1.4 to about 2 times greater than a spot divergence angle and a cut-off frequency approximately from about 0.5 to about 0.7 times greater than the spot divergence angle and multiplying by a scaler in the range from about 2 to about 10.

The method 500 of enhancing laser beam contrast on the remote target 26 may also include synchronizing a pulse rate of the fifth laser signal with a frame rate of the imaging device 14.

It is understood that even though the proposed system and the method for enhancing laser contrast on a remote target 26 is mounted in the airplane 1, the system and the method may also be mounted or used in any other physically structure such as a military truck or a stationary military base.

Various concepts may be exemplified as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various examples or embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code can be executed on any suitable processor or collection of processors, whether provided in a single computer or distributed among multiple computers.

All definitions, as defined and used herein, should be understood to control over dictionary definitions, definitions in documents incorporated by reference, and/or ordinary meanings of the defined terms.

"Logic", as used herein (for example "filtering logic"), includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment or example, to A only (optionally including elements other than B); in another embodiment or example, to B only (optionally including elements other than A); in yet another embodiment or example, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment or example, to at least one, optionally including more than one, A, with no B present (and optionally including elements other than B); in another embodiment or example, to at least one, optionally including more than one, B, with no A present (and optionally including elements other than A); in yet another embodiment or example, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

An embodiment is an implementation or example of the present disclosure. Reference in the specification to "an embodiment," "one embodiment," "some embodiments," "one particular embodiment," "an exemplary embodiment," or "other embodiments," or the like such as "an example," means that a particular feature, structure, or characteristic described in connection with the embodiments is included in at least some embodiments or examples, but not necessarily all embodiments or examples, of the present disclosure. The various appearances "an example," "an embodiment," "one embodiment," "some embodiments," "one particular embodiment," or "other embodiments," or the like, are not necessarily all referring to the same embodiments or examples.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. A system for enhancing laser contrast on a remote target comprising:
   an imaging device;
   an image processor in operative communication with the imaging device;
   a laser system which includes a laser power controller and a laser emitter;
   wherein the image processor is in electrical communication with the laser power controller to synchronize the image processor with the laser power controller and wherein the laser power controller is operatively engaged with the laser emitter; and a first signal formed by a first laser beam generated by the laser system corresponding to a plurality of time frames;

a second signal formed by the first laser beam shifted one time frame relative to the plurality of the time frames;

a third signal formed by subtracting the second signal from the first laser signal; and a bandpass filter and a fourth signal formed by the third signal magnified by the bandpass filter.

2. The system defined in claim 1, further comprising a field of view (FOV) of the imaging device wherein a laser beam emitted from the laser emitter is within the FOV.

3. The system defined in claim 2, further comprising a pulse rate of the laser beam that is a certain integer divider of a frame rate of the imaging device.

4. The system defined in claim 2, wherein the laser system establishes a pulse rate of the laser beam that is at most half of a frame rate of the imaging device.

5. The system defined in claim 4, wherein the pulse rate is in a range about 5 Hz to about 15 Hz.

6. The system defined in claim 1, further comprising a fifth signal formed by the fourth signal added to the first signal.

7. The system defined in claim 6, wherein the pulse rate of the fifth signal is synchronized with a frame rate of the imaging device to form an emitted signal.

8. The system defined in claim 1, wherein the band pass filter has a cut-on frequency from about 1.4 to about 2 times greater than a divergence angle of a laser spot and a cut-off frequency from about 0.5 to about 0.7 times the divergence angle of the laser spot.

9. The system defined in claim 1, wherein the image processor is operatively engaged with the laser power supply and sends a timing signal to the laser emitter.

10. The system defined in claim 1, further comprising a synchronizer to synchronize the image controller and the laser power controller.

11. The system defined in claim 10, wherein the synchronizer is mounted on one of the imaging device and the laser system.

12. A method for enhancing laser contrast on a remote target comprising:

providing an imaging device and an image processor;
providing a laser power controller and a laser emitter;
synchronizing the image processor and the laser power controller with a synchronizer;
generating a first laser signal relative to a plurality of time frames;
shifting a magnitude of the first laser signal one time frame relative to the plurality of time frames to form a second laser signal;
subtracting the second laser signal from the first laser signal to form a third laser signal;
magnifying the third signal using a frequency bandpass filter to form a fourth laser signal;
adding the fourth laser signal to the first signal to form an amplified fifth laser signal;
synchronizing the fifth laser signal with the imaging device by the synchronizer to form a synchronized signal; and
emitting the synchronized signal to a target.

13. The method defined in claim 12, wherein emitting the first laser signal relative to a plurality of time frames further comprises:

emitting a pulsing laser beam having a laser spot with a divergence angle and a pulse rate of the laser beam is at most half of a frame rate of the imaging device.

14. The method defined in claim 12, wherein magnifying the third signal using a bandpass filter to create the fourth laser signal further comprises:

applying the frequency bandpass filter to the third signal with a cut-on frequency from about 1.4 to about 2 times greater than a spot divergence angle and a cut-off frequency from about 0.5 to about 0.7 times the spot divergence angle.

15. The method defined in claim 14, further comprising:

multiplying the third signal by a scaler in the range from about 2 to about 10.

16. The method defined in claim 13, wherein the pulse rate is in a range of about 5 Hz to about 10 Hz.

17. The method defined in claim 12, wherein the first, second, third, fourth, and fifth signals are located within a field of view of the imaging device.

18. The method defined in claim 12, wherein synchronizing the fifth laser signal with the imaging device by the synchronizer to form the synchronized signal further comprises:

synchronizing a pulse rate of the fifth laser signal with a frame rate of the imaging device.

* * * * *